United States Patent
Jones et al.

(10) Patent No.: US 9,537,644 B2
(45) Date of Patent: *Jan. 3, 2017

(54) TRANSMITTING MULTIPLE DIFFERENTIAL SIGNALS OVER A REDUCED NUMBER OF PHYSICAL CHANNELS

(71) Applicant: Lattice Semiconductor Corporation, Portland, OR (US)

(72) Inventors: Graeme P. Jones, Tampa, FL (US); Glenn L. Marks, Corona, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/773,534

(22) Filed: Feb. 21, 2013

(65) Prior Publication Data

US 2013/0223293 A1 Aug. 29, 2013

Related U.S. Application Data

(60) Provisional application No. 61/602,419, filed on Feb. 23, 2012.

(51) Int. Cl.
  H04L 5/14 (2006.01)
  H04L 25/02 (2006.01)
  G09G 5/00 (2006.01)
(52) U.S. Cl.
  CPC ............. H04L 5/14 (2013.01); G09G 5/006 (2013.01); H04L 5/1423 (2013.01); H04L 25/0272 (2013.01)

(58) Field of Classification Search
  None
  See application file for complete search history.

(56) References Cited

U.S. PATENT DOCUMENTS 3,666,890 A    5/1972   Wade
6,205,182 B1   3/2001   Pardini et al.
(Continued)

FOREIGN PATENT DOCUMENTS

CN       1574800 A    2/2005
CN    101005292 A    7/2007
(Continued)

OTHER PUBLICATIONS

PCT International Search Report, PCT Application No. PCT/US2013/027498, Jun. 17, 2013, 3 pages.
(Continued)

Primary Examiner — Bunjob Jaroenchonwanit
(74) Attorney, Agent, or Firm — Fenwick & West LLP

(57) ABSTRACT

Transmitting a bidirectional, virtual differential signal in addition to other differential signals over physical communication channels. Thus, four signal lines can provide three differential signals, where the virtual differential signal is bidirectional. The virtual differential signal can be provided over one or more of the other physical communication channels. Additional configurations allow for providing a bidirectional DC power supply. Additional configurations allow for providing DC power in addition to data over a reduced number of lines. Selective switching of signal lines can allow backward and forward interoperability with other standard interfaces.

17 Claims, 12 Drawing Sheets

(56) References Cited

U.S. PATENT DOCUMENTS

| | | | |
|---|---|---|---|
| 6,463,092 B1 | 10/2002 | Kim et al. | |
| 6,496,540 B1 | 12/2002 | Widmer | |
| 6,731,751 B1* | 5/2004 | Papadopoulos | 379/399.01 |
| 6,832,080 B1* | 12/2004 | Arslan et al. | 455/296 |
| 6,914,597 B2 | 7/2005 | Myers | |
| 7,020,208 B1 | 3/2006 | Yen | |
| 7,085,950 B2 | 8/2006 | Ehmann et al. | |
| 7,154,940 B2* | 12/2006 | Scott et al. | 375/220 |
| 7,339,502 B2 | 3/2008 | Furtner | |
| 7,358,869 B1* | 4/2008 | Chiarulli et al. | 341/58 |
| 7,408,993 B2* | 8/2008 | Webster | 375/257 |
| 7,490,209 B1 | 2/2009 | Charagulla | |
| 7,565,576 B2 | 7/2009 | Seroff | |
| 7,627,044 B2* | 12/2009 | Kim et al. | 375/257 |
| 7,836,363 B2 | 11/2010 | Quinlan et al. | |
| 7,844,762 B2* | 11/2010 | Banks et al. | 710/62 |
| 7,952,538 B2 | 5/2011 | Han et al. | |
| 8,090,030 B2 | 1/2012 | Kim et al. | |
| 8,108,576 B2 | 1/2012 | Shen et al. | |
| 8,176,214 B2 | 5/2012 | Jones et al. | |
| 8,416,852 B2* | 4/2013 | Matsubayashi | 375/240.16 |
| 8,589,998 B2 | 11/2013 | Wu et al. | |
| 8,644,334 B2* | 2/2014 | Altmann | 370/465 |
| 8,692,937 B2* | 4/2014 | Altmann | 348/513 |
| 8,804,853 B2* | 8/2014 | Hsueh | 375/257 |
| 2002/0044147 A1 | 4/2002 | Martin | |
| 2002/0149541 A1* | 10/2002 | Shin | 345/3.1 |
| 2002/0184552 A1 | 12/2002 | Evoy et al. | |
| 2003/0069042 A1* | 4/2003 | Sato et al. | 455/561 |
| 2003/0131310 A1 | 7/2003 | Pitio | |
| 2003/0145258 A1 | 7/2003 | Warner et al. | |
| 2003/0201802 A1 | 10/2003 | Young | |
| 2003/0208779 A1 | 11/2003 | Green et al. | |
| 2004/0036494 A1 | 2/2004 | Mak et al. | |
| 2004/0239374 A1 | 12/2004 | Hori | |
| 2004/0240580 A1 | 12/2004 | Bessios et al. | |
| 2005/0044257 A1 | 2/2005 | Booth et al. | |
| 2005/0280405 A1* | 12/2005 | Bray | 323/312 |
| 2006/0044061 A1* | 3/2006 | Mukherjee et al. | 330/253 |
| 2006/0114046 A1 | 6/2006 | Mizutani | |
| 2006/0126751 A1 | 6/2006 | Bessios | |
| 2007/0057830 A1* | 3/2007 | Wiesbauer et al. | 341/126 |
| 2007/0146011 A1* | 6/2007 | O'Mahony et al. | 326/93 |
| 2007/0200859 A1* | 8/2007 | Banks et al. | 345/520 |
| 2008/0022023 A1 | 1/2008 | Kim et al. | |
| 2008/0037693 A1* | 2/2008 | Andrus et al. | 375/359 |
| 2008/0063129 A1* | 3/2008 | Voutilainen | 375/376 |
| 2008/0285634 A1 | 11/2008 | Raghavan et al. | |
| 2008/0310521 A1 | 12/2008 | Otsuka et al. | |
| 2008/0315920 A1 | 12/2008 | Hung et al. | |
| 2009/0168918 A1 | 7/2009 | Chen et al. | |
| 2009/0252206 A1 | 10/2009 | Rheinfelder et al. | |
| 2010/0013579 A1* | 1/2010 | Horan et al. | 333/28 R |
| 2010/0054738 A1* | 3/2010 | Yuki | 398/65 |
| 2010/0067877 A1* | 3/2010 | Ichimura et al. | 386/96 |
| 2010/0104029 A1 | 4/2010 | Lee et al. | |
| 2010/0138887 A1 | 6/2010 | Nakata | |
| 2010/0215118 A1 | 8/2010 | Ware et al. | |
| 2010/0232484 A1* | 9/2010 | Chiu | 375/220 |
| 2010/0272215 A1 | 10/2010 | Lin et al. | |
| 2010/0329381 A1 | 12/2010 | Shimizu et al. | |
| 2011/0196997 A1 | 8/2011 | Ruberg et al. | |
| 2012/0008263 A1* | 1/2012 | Sugita | 361/679.01 |
| 2012/0082249 A1* | 4/2012 | Hsueh | 375/259 |
| 2012/0098960 A1* | 4/2012 | Fujino et al. | 348/135 |
| 2012/0106949 A1* | 5/2012 | Tang et al. | 398/20 |
| 2012/0155398 A1* | 6/2012 | Oyman et al. | 370/329 |
| 2012/0229310 A1 | 9/2012 | Chang | |
| 2013/0015821 A1* | 1/2013 | Kim et al. | 320/128 |
| 2013/0089110 A1 | 4/2013 | Sharma et al. | |
| 2013/0151875 A1* | 6/2013 | Huynh | 713/310 |
| 2013/0223293 A1* | 8/2013 | Jones et al. | 370/276 |
| 2014/0241457 A1 | 8/2014 | Kim et al. | |

FOREIGN PATENT DOCUMENTS

| | | |
|---|---|---|
| CN | 101542992 A | 9/2009 |
| EP | 1241844 | 9/2002 |
| JP | 2004-520778 A | 7/2004 |
| WO | WO 2007/060620 A1 | 5/2007 |

OTHER PUBLICATIONS

PCT Written Opinion, PCT Application No. PCT/US2013/027498, Jun. 17, 2013, 6 pages.

European Extended Search Report, European Application No. 13751229.9, Dec. 7, 2015, 11 pages.

European Partial Supplementary Search Report, European Application No. 13751229.9, Aug. 19, 2015, 6 pages.

Chinese First Office Action, Chinese Application No. 201380010748.3, Aug. 3, 2016, 25 pages.

Taiwan Office Action, Taiwan Application No. 102106330, Aug. 29, 2016, 15 pages (with concise explanation of relevance).

* cited by examiner

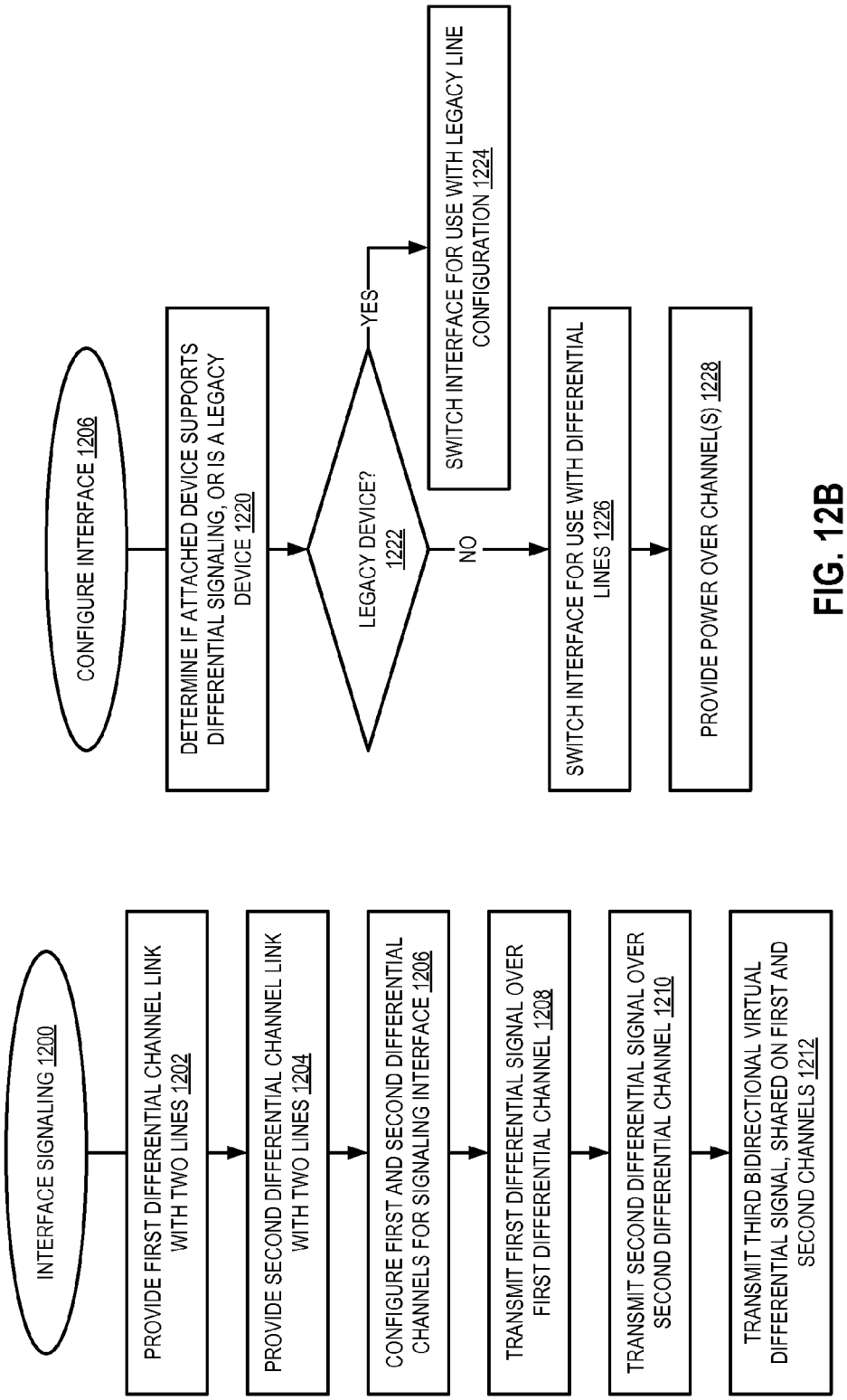

TRANSMITTING MULTIPLE DIFFERENTIAL SIGNALS OVER A REDUCED NUMBER OF PHYSICAL CHANNELS

RELATED APPLICATIONS

This patent application is a non-provisional utility application based on, and claims the benefit of priority of, U.S. Provisional Application No. 61/602,419, filed Feb. 23, 2012.

FIELD

Embodiments of the invention are generally related to physical interconnections, and more particularly to sending differential signals over a reduced number of lines.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright ©2013, Silicon Image, Inc., All Rights Reserved.

BACKGROUND

Many systems rely upon the transmission of signals between devices or components. The transmission of signals may take place in single-ended mode, where a signal is transmitted over a single wire or line, or in differential mode, where a signal is transmitted over a first wire or line, and the signal's complement is transmitted over a paired wire or line. For single-ended signaling, the single transmission line can be considered the physical channel, while for differential signal, the transmission line pair can be considered the physical channel.

As is understood, differential signaling confers benefits in terms of signal integrity, including noise immunity, common mode noise rejection, and reduced electromagnetic emissions as compared to single-ended signaling. These benefits may be desired for improved transmission in certain electrically noisy environments or where the signal itself may cause interference elsewhere. However, one disadvantage of differential signaling as compared to single-ended signaling is the requirement for twice as many wires or physical transmission media (assuming that a ground wire, plane, or shield is not required, or that a single ground return can be used for multiple signal wires).

Some systems have constraints on the number of wires or physical channels available to transmit signals. For purposes of simplicity in description, the expression "physical channel" will be used to refer to any electrical conductor, as well as wireless transmission, or optical signal channel. A differential link or channel uses two physical wire or lines, and thus can refer to a pair of wires, printed circuit board traces, or other pair of conductors. The constraints of some systems mean that there are not as many physical lines available for signaling as there are signals to be transmitted. Especially when differential signaling is employed, the available wires or physical lines may be already fully occupied for a specific application without sufficient wires or physical lines for all the signals required.

Previous work, for example, as described in U.S. Pat. No. 6,492,984, recognizes that a "virtual" common-mode signal may be transmitted over an existing differential physical channel while allowing recovery of both the differential signal and the common-mode signal. However, the resulting transmitted common-mode "virtual" signals are subject to the signal integrity limitations described earlier.

Additionally, using differential signaling in some systems may require adapting certain physical interfaces to provide differential signaling. Such adaptations may prevent the use of legacy devices that are not compatible with the differential signaling interface.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 12A is a flow diagram of an embodiment of transmitting three differential signals, including a virtual bidirectional differential signal, over two physical channels.

FIG. 12B is a flow diagram of an embodiment of configuring an interface to transmit either three differential signals over two physical channels, or to transmit in accordance with a legacy interconnection interface.

Figure 1:
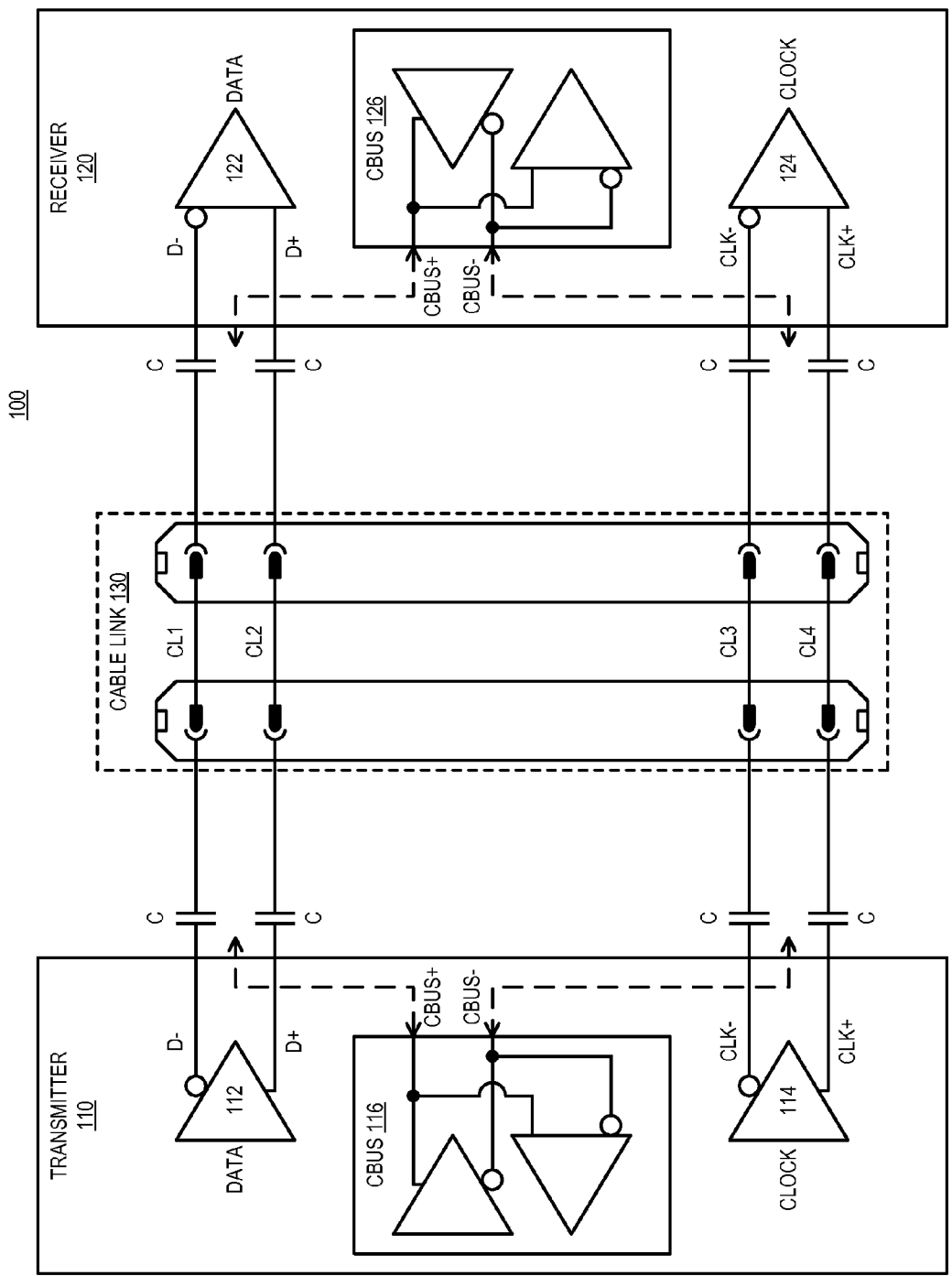
FIG. 1 is a block diagram of an embodiment of a system that implements two differential channels, each over two physical lines, and a third virtual bidirectional differential channel over the existing two differential channels.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a "virtual" differential channel is provided over two existing physical communication channels, reducing the total number of wires or lines required to transmit that signal. Briefly, a first differential signal is transmitted over one physical differential channel, and a second differential signal is transmitted over a second physical differential channel. A third differential signal is transmitted virtually over the lines in the system, by overlaying and/or modulating the third differential signal onto physical signal lines.

In one embodiment, the third differential signal is sent virtually by common mode modulating a modal (positive) differential component on one of the physical differential channels, and common mode modulating an anti-modal (negative) differential component on the other physical differential channels. The common mode signal described herein will be rejected on both the first and second channel receivers with respect to the first and second differential channel signals. The third "virtual" signal is reconstructed at the transceiver by recovering the common mode signals on the first and second physical channels. Thus, all three signals may be transmitted and recovered simultaneously over two pairs of wires or physical channels.

It will be understood that differential signaling offers reduced emissions and offers superior immunity from interference from external noise sources. Differential signaling is achieved by transmitting each signal across the link with an anti-phase complement signal. The transmission is also referred to as sending a modal component (also referred to as the signal, or positive component) and an anti-modal component (also referred to as the signal complement, or negative component).

As described herein, a system can transmit three differential signals over four lines. Thus, the cables, connectors, or other means of transmission required for a signaling interface can be smaller, simpler, less expensive, and more reliable in electrically noisy or noise-sensitive environments. Applications of the described techniques herein can be used for any system in which a plurality of data is to be transferred over a relatively noisy or noise-sensitive environment with a reduced number of physical channels. Example application environments may include (but are not limited to): home networking, automobile data or infotainment systems, home consumer electronics or data networking systems, industrial control systems, industrial monitoring systems, or electronic signage systems. For example, such signaling can allow the transmission of uncompressed video data. In one embodiment, such signaling can provide an interface compatible with MHL (mobile high-definition link) over USB (universal serial bus). In one embodiment, the interface enables transmitting MHL over a micro-USB port, such as would allow smart phone or tablet docking to automobile or video equipment.

Thus, a bidirectional, virtual differential signal can be transmitted in addition to other differential signals over physical communication channels. The third differential signal can be transmitted concurrently while sending either or both of the first and second differential signals. The virtual communication channel is provided using the first and second differential communication channels. In one embodiment, configurations allow for providing power and the signals over a five-line interface. In one embodiment, a five-line interface can enable backwards compatibility with legacy systems via selective switching of signal lines.

In one embodiment, as described herein, a four line system can provide two differential signals and one or both components of DC power (i.e., voltage supply, ground return, or both). Thus, bidirectional DC power can be provided across a cable link or across a data link without one or both power rails present in the link as discrete lines. Thus, in addition to, or alternatively to, providing an additional differential signal over a reduced number of lines, power can be provided over a link with a reduced number of lines.

FIG. 1 is a block diagram of an embodiment of a system that implements two differential channels over two physical links, and a third virtual bidirectional differential channel over the two physical links. System 100 includes transmitter 110 coupled to receiver 120 via cable link 130. Cable link 130 can be considered an interface. As shown, cable link 130 includes four ports on both the transmitter and receiver sides: CL1-4, which provide four lines, or two differential pairs over which system 100 transmits three differential signals. It will be understood that regardless of the example orientation of the illustration, each end of each line could be male or female. Both ends of each line could be the same or different gender or connector type. In one embodiment, one respective side or end of the cable link connector is included in the transmitter or the receiver.

In one embodiment, one of the differential signals is a data signal as generated at driver element 112. The data signal is driven as the modal component (D+) and its complement or anti-modal component (D−) on different lines or components of one of the physical differential channels. In one embodiment, one of the differential signals is a clock signal as generated at driver element 114. The clock signal can likewise be driven as the clock modal component (CLK+) and its complement or anti-modal component (CLK−) on different lines or components of one of the physical differential channels.

In one embodiment, system 100 uses a third differential signal, CBUS (control bus), generated at transceiver 116. In one embodiment, the positive component of the CBUS signal (CBUS+) is common mode modulated onto both lines CL1 and CL2 that carry the data signal. In one embodiment, the complementary component (or negative component) of the CBUS signal (CBUS−) is common mode modulated onto both lines CL3 and CL4 that carry the clock signal. It will be understood that the polarity of the signaling could be reversed (e.g., transmitting CBUS− over the data signal and CBUS+ over the clock signal). Additionally, the lines used for clock and data could be reversed (both internally by swapping which line transmits the positive and negative differential component and/or by swapping which set of lines transmits the clock and data signals). In one embodiment, system 100 provides AC coupling of the differential signals, as illustrated by the capacitors between transmitter 110 and cable link 130 and the capacitors between cable link 130 and receiver 120. The AC coupling allows for DC offsets to exist between opposite ends of the same line.

It will be understood that system 100 allows the transmission of three separate signals without needing to have the third signal transmitted over discrete signal lines. The signals transmitted from transmitter 110 to receiver 120 can carry various information, including (but not exclusively) video, audio, control, and/or clock. For purposes of illustration, the data signal transmitted from element 112 and the clock signal transmitted from element 114 are shown as unidirectional signals. The CBUS signal transmitted from transceiver 116 is a bidirectional control signal. Thus, the CBUS signal can also be received at transceiver 116 over cable link 130.

Thus, differential signaling of two of the signals (e.g., data and clock) is provided over physical channels (e.g., two conductors), and the third signal is provided over a virtual third channel. It will be understood that any number of other signals could be used instead of data and/or clock. In one embodiment, the virtual third channel is created by common-mode signal modulation over the two physical channels. Thus, as distinct from known common-mode modulation schemes, two common-mode modulated signals are used to provide a transport mechanism for a virtual bidirectional differential signal between the two other channels. The modal component (the signal or the positive component) is sent over one physical channel, and the anti-modal component (the complement or the negative component) is sent over the other physical channel.

In one embodiment, at both the transmitter and receiver end of cable link 130 the CBUS differential signal can be reconstructed by recovering the common-mode signals from the clock physical channel and the data physical channel. Element 122 (the data signal receiver) will tend to reject the CBUS+ signal component, and element 124 (the clock signal receiver) will tend to reject the CBUS− signal component. Thus, the recovery of the other two signals will not be adversely affected by the third virtual common-mode modulated differential signal.

With differential signaling, the receiver is only sensitive to differences between the transmitted signal and its complement and effectively ignores or rejects common mode signals received. To further improve noise immunity, the wires in a cable transmitting the desired signal and its complement may be physically twisted together to cancel out the magnetic fields induced by single ended noise voltages, further reducing unwanted emissions and improving noise immunity. Similar benefits can be achieved with parallel traces, or other forms of parallel wiring. If wireless or optical signaling is used, both components of the signal can be sent and recovered, which would then recreate a differential signal when converted back to electrical form, which can then be recovered.

It will be understood that while differential signals are generated and recovered electrically, they could be transmitted over other physical media. For example, a differential signal could be created with electrical components, converted into two separate light signals and sent optically, then converted back to electrical signals, which would be differential based on the two separate signal components. Similar techniques could be used to transmit the differential signals over wireless communication media. Alternatively, a differential signal could be created, converted to a single optical or wireless system, and then converted back to a differential electrical signal at a receiving end of the optical or wireless signal. Differential signaling can result in superior system performance and reduced requirements for cable and device shielding compared to traditional single-ended signaling techniques. This can make the cable thinner, easier to route, more flexible and less expensive to manufacture.

Given that the CBUS signal is a bidirectional differential signal, system 100 includes a mechanism to determine whether the signal is transmitted left to right (from transmitter 110 to receiver 120), or from right to left (from receiver 120 to transmitter 110). In one embodiment, system 100 uses protocol arbitration to allow the control signals to be sent in both directions in turn, based on system requirements. Examples of uses of a bidirectional control bus signal can include (but are not limited to) remote control commands, system status, content protection key selection, and display discovery.

Figure 2:
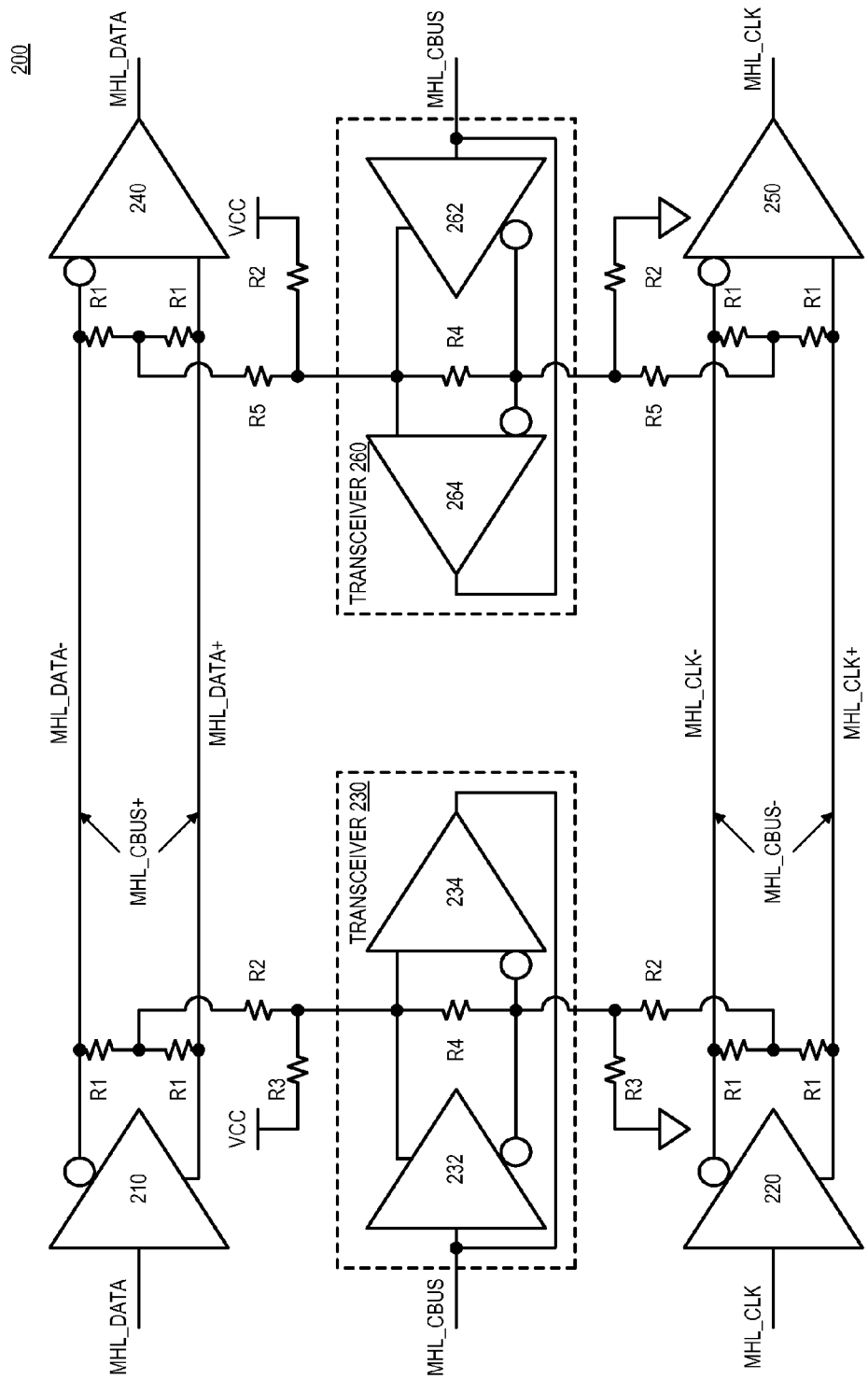
FIG. 2 is a block diagram of an embodiment of a system with divider networks to implement a third virtual bidirectional differential channel over two physical differential channels.

FIG. 2 is a block diagram of an embodiment of a system with divider networks to implement a third virtual bidirectional differential channel over two physical links. In one embodiment, a virtual signal can be generated by combining differential signal components with common-mode signal components to represent a virtual signal by means of a potential divider network. System 200 illustrates a simplified embodiment of an example of potential divider networks and transmit/receive components to implement a third virtual bidirectional differential channel over two physical links.

Specifically, the example of system 200 contemplates an embodiment of an implementation for MHL (mobile high-definition link). Thus, three differential signals are transmitted: MHL_DATA, MHL_CBUS, and MHL_CLK. System 200 transmits MHL_DATA from the driver 210 to receiver 240 over a physical differential channel where the signal is recovered. MHL_DATA− is sent on one physical line, and MHL_DATA+ is sent on the other physical line. System 200 transmits MHL_CLK from driver 220 over a second physical differential channel to receiver 250 where the signal is recovered. MHL_CLK− is sent on one physical line, and MHL_CLK+ is sent on the other physical line.

In one embodiment, bidirectional MHL_CBUS is common-mode modulated between transceiver 230 and transceiver 260. MHL_CBUS+ is shown transmitted over the data signal (on both physical lines), and MHL_CBUS− is shown transmitted over the clock signal (on both physical lines). Alternate embodiments could select which signal component is sent over which physical channels. Thus, in the "left-to-right" direction, driver 210 drives signal MHL_DATA over a first differential channel and driver 220 drives signal MHL_CLK over a second differential channel. Transceiver 230 (with elements 232 and 234) can drive signal MHL_CBUS partly on the first and partly on the second differential channels. In the "right-to-left" direction, transceiver 260 (with elements 262 and 264) can drive signal MHL CBUS over the same channels.

Receiver 240 receives differential signal MHL_DATA, and MHL_CBUS+, where MHL_CBUS+ is rejected by receiver element 240, but received by transceiver 260. Similarly, receiver element 250 receives differential signal MHL_CLK, and MHL_CBUS−, where MHL_CBUS− is rejected by receiver element 250, but received by transceiver 260. Thus, receiver elements 240 and 250 will ignore or reject the unwanted common mode signal (CBUS) and only decode the desired differential signals. Transceiver 260 provide a similar divider network at a receiving device as used by transceiver 230 to transmit from the transmitting device, which allows the transceivers to extract the common-mode signals from the differential signal. In one embodiment, two or all three channels shown in system 200 could be rendered bidirectional. It will be understood that in the case multiple signals are rendered bidirectional, the modulation and recovery circuits become increasingly more complex.

In one embodiment, the number of physical channels could be increased and the same techniques herein used to provide additional virtual bidirectional differential channels.

It will be understood from the figure that wires that cross or intersect are connected, and wires that "jump over" each other are not connected. It will be understood that the values of the resistors can be dependent on the implementation. Thus, specific values are not shown, but those of skill in the art can determine the values. For purposes of the example of system 200, resistors that in one embodiment have the same value share the same resistor reference number. For example, the resistors of the potential dividers between the differential lines of the transmitters and receivers are all labeled R1, meaning they could be the same value.

A resistor R2 connects on one end to the point between the two resistors R1 coupled between the MHL DATA differential lines. On the other end, the resistor R2 couples to the non-inverting line of elements 232 and 234, as well as to a resistor R4. The same end of the resistor R2 couples to VCC through a resistor R3. The resistor R4 is coupled between the non-inverting and inverting lines of elements 232 and 234. Another resistor R2 connects on one end to the point between two other resistors R1 coupled between the MHL_CLK differential lines. On the other end, the resistor R2 couples to the inverting line of elements 232 and 234, as well as to the resistor R4. The same end of the resistor R2 couples to GND through another resistor R3.

At the receiver end, a resistor R5 connects on one end to the point between the two resistors R1 coupled between the MHL_DATA differential lines. On the other end, the resistor R5 couples to the non-inverting line of elements 262 and 264, as well as to a resistor R4. The same end of the resistor R5 couples to VCC through a resistor R2. The resistor R4 is coupled between the non-inverting and inverting lines of elements 262 and 264. Another resistor R5 connects on one end to the point between two other resistors R1 coupled between the MHL_CLK differential lines. On the other end, the resistor R5 couples to the inverting line of elements 262 and 264, as well as to the resistor R4. The same end of the resistor R5 couples to GND through another resistor R2.

Other potential divider network combinations are possible. It will also be understood that the complexity of the potential divider network increases in an embodiment where either the data signal or the clock signal are made bidirectional, and/or where more differential signals are transmitted over more lines.

Figure 3:
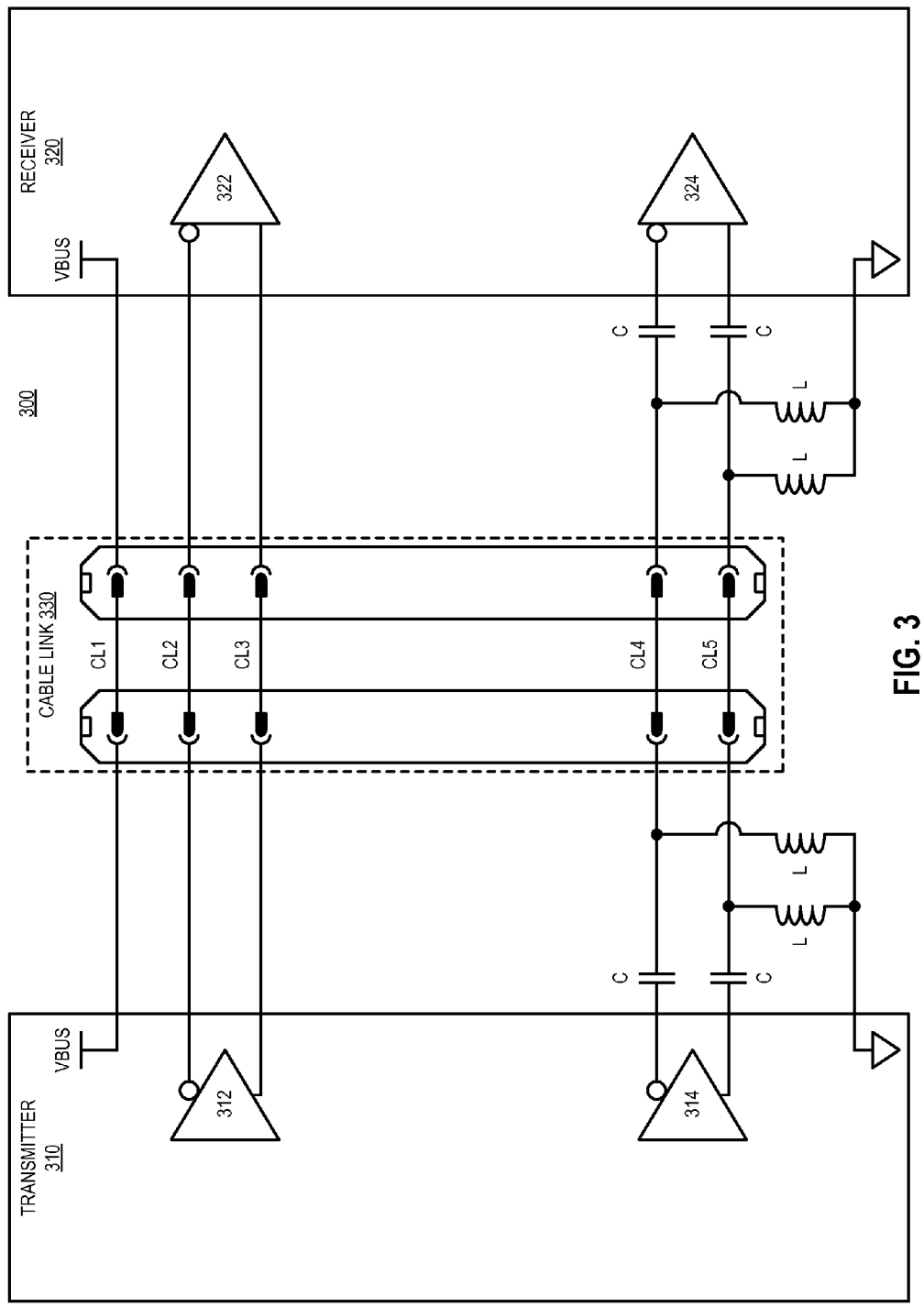
FIG. 3 is a block diagram of an embodiment of a system that implements two differential channels over two physical channels, and bidirectional DC power.

FIG. 3 is a block diagram of an embodiment of a system that implements two differential channels over two physical channels, and bidirectional DC power. In one embodiment, system 300 can be implemented in a system such as system 100. More particular to system 300, the system can be implemented with a standard, well-known interface port. For example, a standard micro-USB port has 5 pins (power, ground, and 3 signal lines). Instead of using the standard pin-out or pin or port configuration, cable link 330 can provide two differential channels and cable link for power. Only by way of example, the power rail shown in a voltage supply referred to herein as VBUS, and is shown on line CL1 of cable link 330. VBUS could alternatively be referred to by any number of different designations.

Transmitter device 310 includes driver 312 to generate a differential signal on lines CL2 and CL3. Receiver device 320 includes element 322 to receive the differential signal on the other end of lines CL2 and CL3. In one embodiment, for simple reference, the ends of cable link 330 could be referred to as the transmitter end and the receiver end, or the transmitter side and the receiver side. Transmitter 310 further includes driver 314 to generate a differential signal on lines CL4 and CL5. Receiver 320 includes element 324 to receive the differential signal on lines CL4 and CL5.

In one embodiment, the lines of the differential channel on cable link lines CL4 and CL5 each include a capacitor, at both the side of transmitter 310 as well as the side of receiver 320, to AC-couple the two lines. The AC coupling permits DC offsets between transmitter 310, receiver 320, cable pairs of cable link 330, and ground. As mentioned above, DC power between sink and source or source and sink (transmitter 310 and receiver 320) can be added to the link of system 300 by using pin CL1 for VBUS +5V. It will be understood that providing DC power also requires a ground return path.

The ground return path is provided by DC referencing one or both signal pairs to ground (referred to as GND) using inductors. As illustrated, inductors L reference the differential channel of CL4 and CL5 to GND. While not explicitly shown, it will be understood that inductors L include an inherent, characteristic series resistance as well as an inherent, characteristic parallel capacitance. The parallel capacitance in the inductor causes the component to operate as a frequency dependent filter.

Thus, inductors L on wires CL4 and CL5 provide a DC path for the ground return while allowing high frequency signals to pass unimpeded. Thus, transmitter 310 can terminate to a local ground (as shown inside transmitter 310), and receiver 320 can terminate to a local ground (as shown inside receiver 320). The local ground refers to a reference chassis other grounding path local to the transmitter/receiver, and which is not necessarily the same across cable link 330. By terminating locally, but providing a DC ground return path via inductors L, a DC ground return path is established through the inductors over a differential pair while allowing the differential signals to pass unimpeded.

In one embodiment, system 300 includes inductors on both wires of a differential channel as opposed to simply one of the lines, which is technically adequate to provide a ground return path. While a ground return path inductor could be placed on a single line, by placing inductors L on both line CL4 and line CL5, system 300 can provide a more balanced transmission line for differential signaling over the differential channel. A single line ground return path inductor (e.g., on either CL4 or CL5 but not both) could be technically sufficient to provide power across cable link 330 or the data link, but may introduce mode conversion noise.

Additionally, as already mentioned, inductors L include a series resistance component, which will increase the DC resistance of the power path between transmitter 310 and receiver 320. Placing inductors L on both lines of the differential channel effectively places the resistances in parallel for purposes of the ground termination. It is well understood that placing resistances in a parallel network reduces the overall resistance. Thus, adding two inductors L on each side (i.e., on both the side of transmitter 310 and receiver 320), system 300 provides DC power with lower DC resistance losses.

Figure 4:
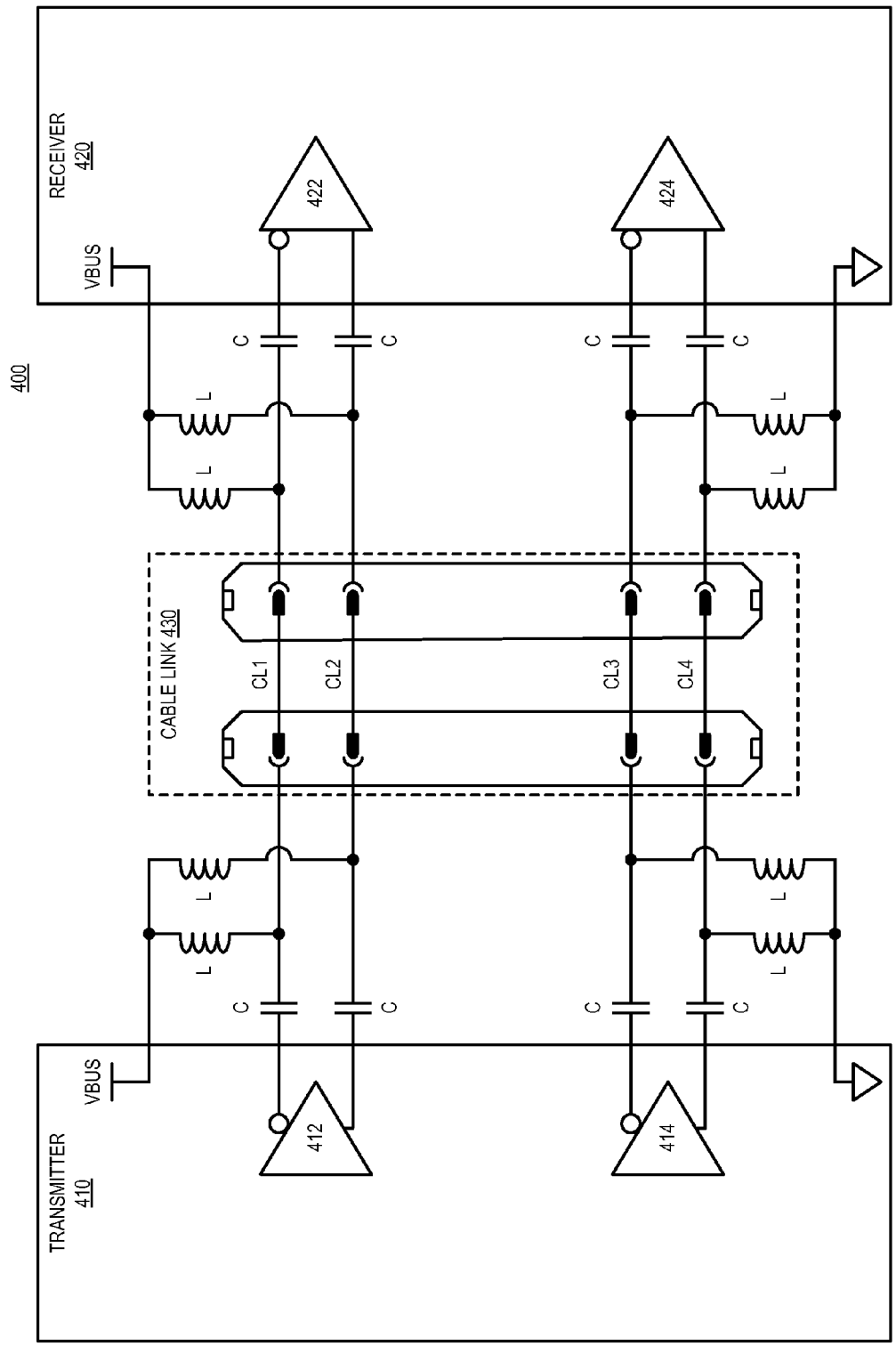
FIG. 4 is a block diagram of an embodiment of a system that implements two differential channels over two physical channels, and provides bidirectional DC power over the same physical channels.

FIG. 4 is a block diagram of an embodiment of a system that implements two differential channels over two physical channels, and provides bidirectional DC power over the same physical channels. Whereas system 300 provides power over two differential channels and a fifth signal line, system 400 provides power with only the four signal lines of the two differential channels by using the same technique of system 300. Namely, in system 400, both power and ground rails are connected via inductors allowing high frequency signals to pass unimpeded. Capacitors on the signal lines allow DC offsets in system 400 across cable link 430.

Transmitter device 410 includes driver elements 412 and 414 to drive the first and second differential lines. Receiver device 420 includes receiver elements 422 and 424 to receive, respectively, the differential signals of the corresponding differential signal lines. For purposes of convention for explanation, the differential channel between transmitter element 412 and receiver element 422 will be referred to as a first differential channel, and the differential channel between transmitter element 414 and receiver element 424 will be referred to as a second differential channel. It will be understood that designations of "first" and "second" can be reversed.

As illustrated, inductors L are coupled to provide a power path from the signal lines of the first differential channel to VBUS or the voltage rail, and inductors L are coupled to provide a ground path from the signal lines of the second differential channel. As shown, VBUS and ground can be reference points or voltage/power rails within transmitter 410 and receiver 420. Thus, in one embodiment, on the transmitter side of CL1 and CL2, the inductors provide a power path from the signal lines to the voltage rail local to transmitter 410. On the receiver side of CL1 and CL2, the inductors can provide a power path from the signal lines to the voltage rail local to receiver 420. Similarly, in one embodiment, on the transmitter side of CL3 and CL4, the inductors provide a ground path from the signal lines to the ground local to transmitter 410. On the receiver side of CL3 and CL4, the inductors can provide a ground path from the signal lines to the ground local to receiver 420.

In system 400, both components of power are coupled to two signal lines on each side of the link. As mentioned previously, providing a power path from both signal lines of a differential channel to power (either ground return path or voltage rail) via inductors effectively places the inductors in parallel, which reduces the DC resistance of the inductor devices. Additionally, using the parallel configuration balances the lines to avoid mismatch. As illustrated, system 400 can provide power in either direction across cable link 430, and can, for example, power an attached device (e.g., a smartphone) over the cable link. It will be understood that instead of the configuration shown, system 400 could be modified to provide a power path from the first differential channel to ground, and the second differential channel to VBUS. Additionally, while system 400 is illustrated as using a pin-out of CL1 and CL2 between elements 412 and 422 and CL3 and CL4 between elements 414 and 424, any other pin-out configuration could be used.

Figure 5:
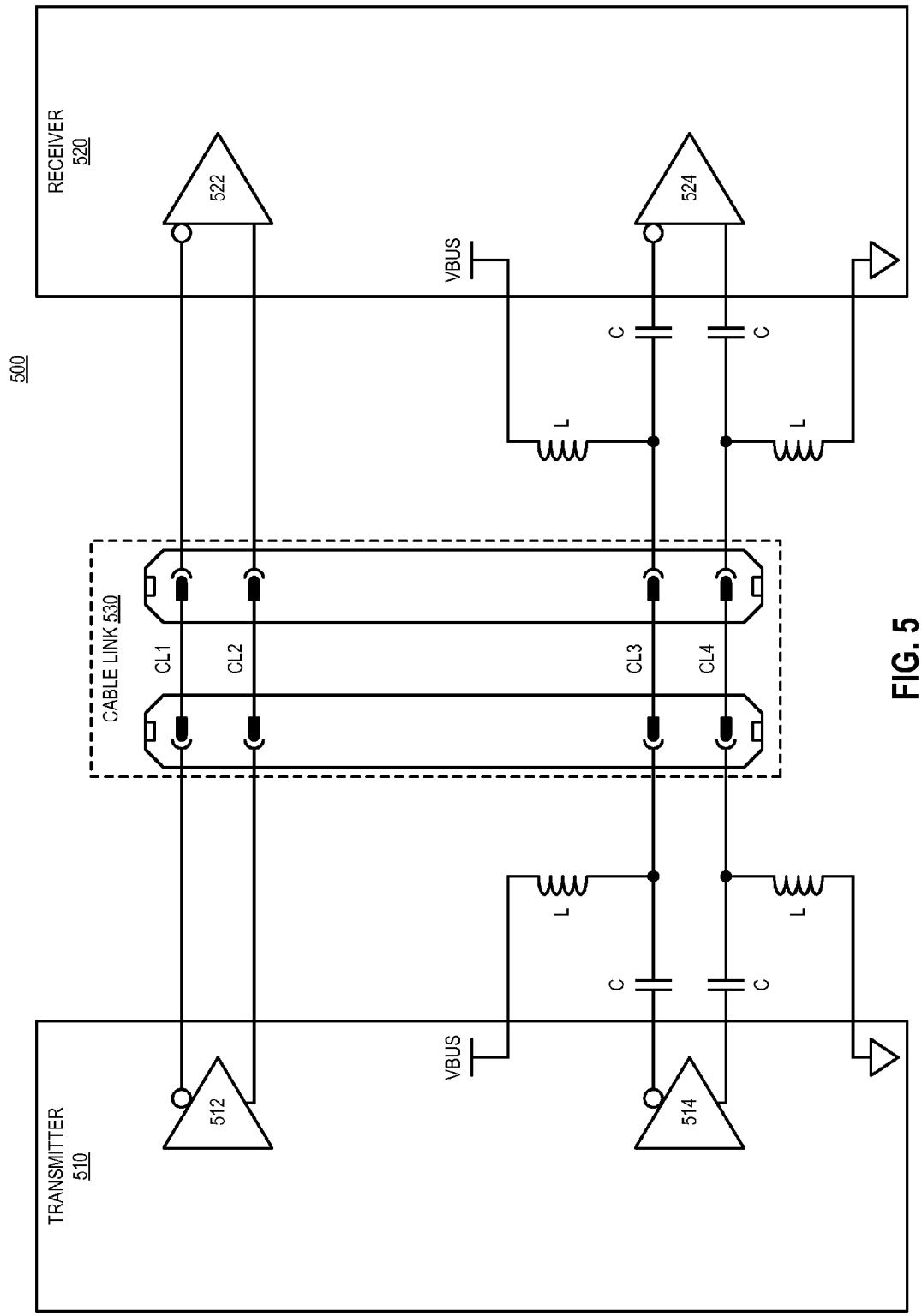
FIG. 5 is a block diagram of another embodiment of a system that implements two differential channels over two physical channels, and provides bidirectional DC power over the same physical channels.

FIG. 5 is a block diagram of another embodiment of a system that implements two differential channels over two physical channels, and provides bidirectional DC power over the same physical channels. Similar to system 400, system 500 provides power with only the four signal lines of the two differential channels by using a similar technique of system 300. In system 500, both power rails are connected via inductors, but only on one differential channel, providing a DC power rail or power supply and a ground return path with a single differential channel.

Transmitter device 510 includes driver elements 512 and 514 to drive the first and second differential lines. Receiver device 520 includes receiver elements 522 and 524 to receive, respectively, the differential signals of the corresponding differential signal lines. Again, for purposes of convention for explanation, the differential channel across CL1 and CL2 of cable link 530 between transmitter element 512 and receiver element 522 will be referred to as a first differential channel, and the differential channel across CL3 and CL4 of cable link 530 between transmitter element 514 and receiver element 524 will be referred to as a second differential channel. It will be understood that designations of "first" and "second" can be reversed.

As illustrated, the first differential channel does not include capacitors. The capacitors can be optional in system 500 on the first differential channel, because there is not expected to be a DC offset over the first differential channel, due to the fact that power is not transferred across that channel. As with system 400, it will be understood that instead of the configuration shown, system 500 could be modified to use a different pin-out cable link 530.

On the second differential channel, inductors L are coupled to provide a path from one of the signal lines to ground, and inductors L are coupled to provide a path from the other signal line to VBUS or the voltage supply or voltage rail. As shown, VBUS is coupled through an inductor L to the anti-modal leg or signal line, and ground is coupled through an inductor L to the modal leg or signal line. The orientation of which signal line couples to which power component can be reversed. The coupling to VBUS and ground occurs at both ends of the link to the local power rails. It will be understood that the coupling capacitors on the transmitter side are positioned between transmitter 510 and the reference inductors on the signal lines. Similarly, the coupling capacitors on the receiver side are positioned between receiver 520 and the reference inductors on the signal lines.

In system 500, both power rails are coupled only on the second differential channel. In one embodiment, both the first and second differential channels could be configured to each have one of the two signal lines provide a path via inductors to ground and the other of the two signal lines provide a path via inductors to VBUS. Thus, for example, the modal lines of both the first and second differential channels could provide a path via inductors to VBUS, and the anti-modal lines of both the first and second differential channels could provide a path via inductors to ground. Again, the power rails could be reversed.

Figure 6:
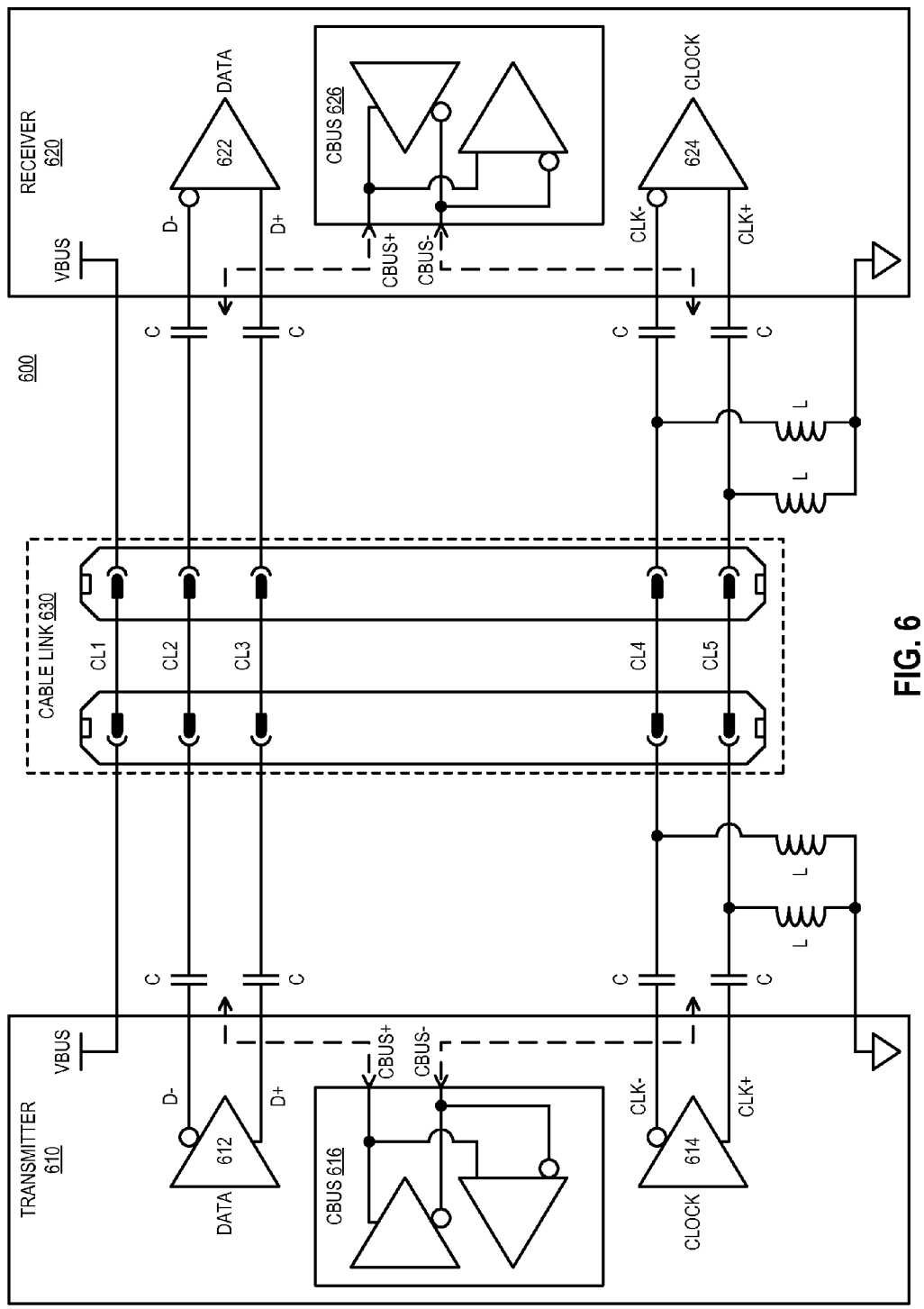
FIG. 6 is a block diagram of an embodiment of a system that implements a third virtual bidirectional differential channel over two physical channels with bidirectional DC power.

FIG. 6 is a block diagram of an embodiment of a system that implements a third virtual bidirectional differential channel over two physical links with bidirectional DC power rail. In one embodiment, system 600 represents an example system 100. More particular to system 600, the system can be implemented with a standard, well-known interface port. For example, a standard micro-USB/MHL connector has 5 pins (power, ground, and 3 signal lines). However, using such a connector for MHL in a noisy environment could result in poor signal integrity. By leveraging the same connector or port, but sending three differential signals over four lines, the 5-line interface can provide three differential signals, which can improve the signal integrity of an MHL or other high speed data link, as well as providing bidirectional DC power across the data link represented by cable link 630.

The power supply or power rail is referred to as VBUS, and is shown on line CL1 of cable link 630. Transmitter 610 includes driver 612 to generate the differential data signal on lines CL2 and CL3. Receiver 620 includes element 622 to receive the data signal on lines CL2 and CL3. Transmitter 610 includes driver 614 to generate the differential clock signal on lines CL4 and CL5. Receiver 620 includes element 624 to receive the clock signal on lines CL4 and CL5. In one embodiment, CBUS transceiver 616 exchanges CBUS+ over the data channel with CBUS transceiver 626, and exchanges CBUS− over the clock channel with CBUS transceiver 626.

In one embodiment, each differential line, at both the side of transmitter 610 as well as the side of receiver 620, includes a capacitor to AC-couple the two differential pairs, which permits DC offsets between transmitter 610, receiver 620, cable pairs of cable link 630, and ground. As mentioned above, DC power between sink and source or source and sink (transmitter 610 and receiver 620) can be added to the link of system 600 by using pin CL1 for VBUS +5V. It will be understood that providing DC power also requires a ground return path.

The ground return path is provided by DC referencing one or both signal pairs to GND using inductors. As illustrated, the CLK signal channel is DC referenced to GND through inductors L. Additionally or in the alternative, the data signal channel could be DC referenced to GND. While not explicitly shown, it will be understood that inductors L include an inherent, characteristic series resistance as well as an inherent, characteristic parallel capacitance. The parallel capacitance in the inductor causes the component to operate as a frequency dependent filter.

Thus, inductors L on wires CL4 and CL5 provide a DC path for the ground return while allowing high frequency signals to pass unimpeded. Thus, transmitter 610 can terminate to a local ground, and receiver 620 can terminate to a local ground. The local ground refers to a reference chassis other grounding path local to the transmitter/receiver, and which is not necessarily the same across cable link 630. By terminating locally, but providing a DC ground return path via inductors L, a DC ground return path is established through the inductors over the data link while allowing the AC signals to pass unimpeded.

In one embodiment, system 600 includes inductors on both wires of a differential channel as opposed to simply one of the lines, which is technically adequate to provide a ground return path. While a ground reference inductor could be placed on a single line, by placing inductors L on both line CL4 and line CL5, system 600 can provide a more balanced transmission line. A single line ground reference inductor (e.g., on either CL4 or CL5 but not both) could introduce mode conversion noise. Additionally, as already mentioned, inductors L include a series resistance component, which will increase the DC resistance of the power path between transmitter 610 and receiver 620. Placing inductors L on both lines of the differential channel effectively places the resistances in parallel for purposes of the ground return path. Thus, adding two inductors L on each side (i.e., on both the side of transmitter 610 and receiver 620), system 600 provides DC power with a lower DC resistance losses.

In certain embodiments, it is important to maintain backwards compatibility of the interface with earlier versions of the interface to ensure interoperability. Such backwards compatibility or support for legacy systems can be accomplished by physically switching between the legacy interface configuration and a new configuration (such as described herein) of the interface connector. In one embodiment, the switches are ganged together, as illustrated by dashed lines between the switches. Position of the switches (and therefore control of which configuration is selected) is accomplished by control logic that performs discovery/detection of the attached device, by performing operations such as those described in FIGS. 12A and 12B. Ganging of the switches across the cable link (e.g., ganging of switches at both the transmitter and receiver sides) can be accomplished via a discovery process as established over a control bus or control line. The logic can be dedicated control logic hardware and/or a controller, firmware on an existing controller, a portion/process of a control routine, or other control logic. Examples follow of systems that include legacy support.

Figure 7:
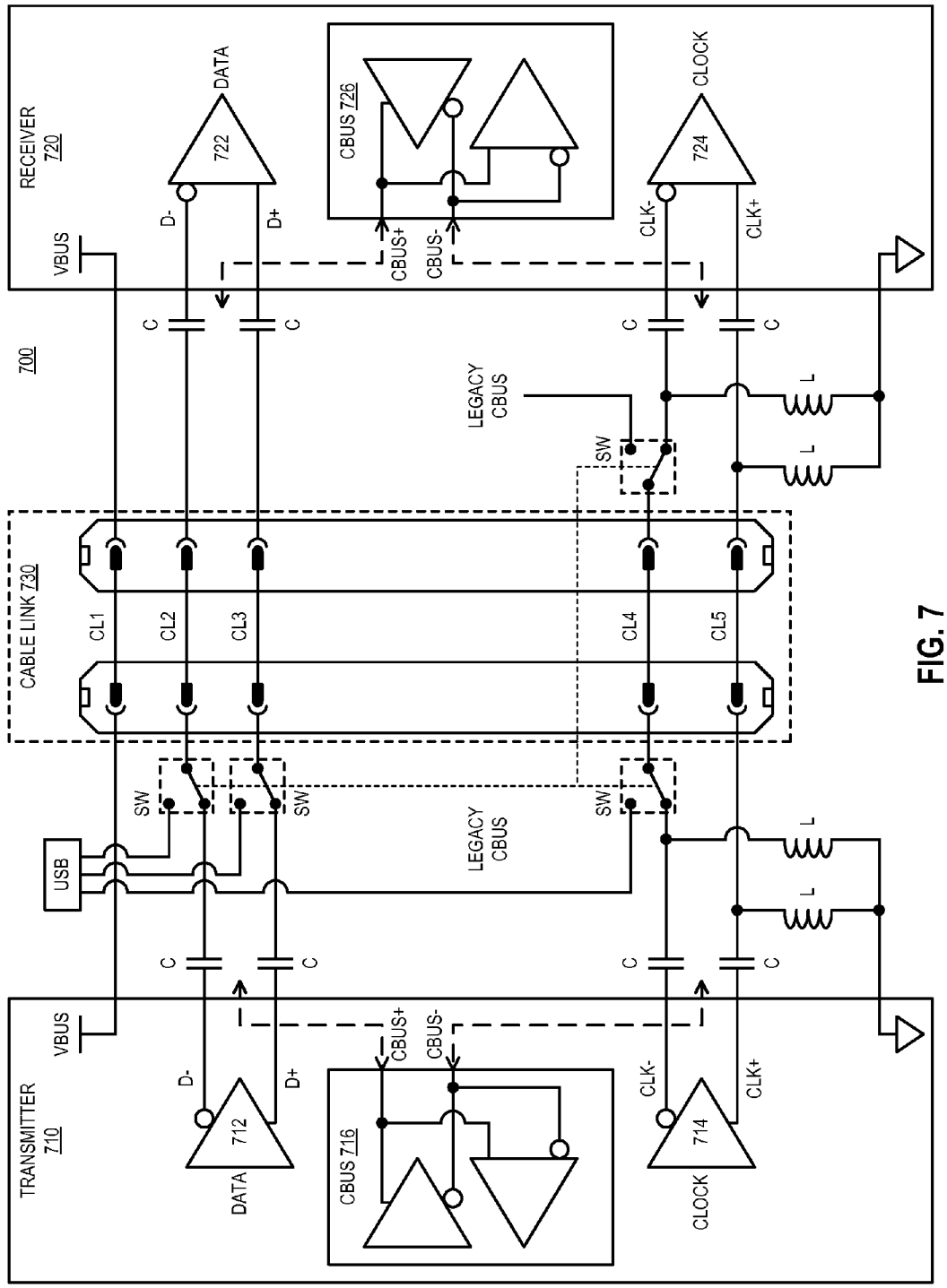
FIG. 7 is a block diagram of an embodiment of a system that implements a third virtual bidirectional differential channel over two physical channels with bidirectional DC power, and maintains backwards compatibility to legacy interfaces.

FIG. 7 is a block diagram of an embodiment of a system that implements a third virtual bidirectional differential channel over two physical links with bidirectional DC power, and maintains backwards compatibility to legacy interfaces. In one embodiment, system 700 represents an example of system 100. In one embodiment, system 700 represents an example of system 600. More particular to system 700, the system can be implemented with a standard, well-known interface port, and provide support for a legacy connection to the standard interface port. Thus, for example, a standard micro-USB port can be used with power and support for a legacy connection. By leveraging the same port, but sending three differential signals over four lines, the 5-line interface can provide three differential signals as well as providing power, and can be switched to support the legacy connections of the port. Switching can be performed by multiple discrete switches or with a switch matrix.

The power rail is referred to as VBUS, and is shown on line CL1 of cable link 730. In a configuration where system 700 is used to transmit three differential signals over four signal lines, system 700 is configured similarly to system 600. Namely, transmitter 710 includes driver 712 to generate the differential data signal on lines CL2 and CL3. Receiver 720 includes element 722 to receive the data signal on lines CL2 and CL3. Transmitter 710 includes driver 714 to generate the differential clock signal on lines CL4 and CL5. Receiver 720 includes element 724 to receive the clock signal on lines CL4 and CL5. In one embodiment, CBUS transceiver 716 exchanges CBUS+ over the data channel with CBUS transceiver 726, and exchanges CBUS− over the clock channel with CBUS transceiver 726.

In one embodiment, each differential line, at both the side of transmitter 710 as well as the side of receiver 720, includes a capacitor to AC-couple the two differential pairs, which permits DC offsets between transmitter 710, receiver 720, cable pairs of cable link 730, and ground. System 700 provides VBUS on CL1, and provides the ground return path (or power sink rail) by DC referencing one or both signal pairs to GND using inductors. As illustrated, inductors L on wires CL4 and CL5 couple the signal line to ground to provide a ground return path. Thus, transmitter 710 can terminate to a local ground, and receiver 720 can terminate to a local ground.

In one embodiment, system 700 includes switches to selectively switch between using four lines for three differential signals as described above, and using line CL5 as a clock signal and using line CL4 as a legacy (single-ended) control bus signal. Data can still be sent differentially over CL2 and CL3, and VBUS remains on CL1. Typically, all switches will be operated together or substantially simultaneously and so can be referred to as a switch matrix. Thus, in one embodiment, there is a single activation for all switches to change. In one embodiment, system 700 includes detection hardware (not explicitly shown) and/or detection logic to determine if the connected or attached device (i.e., transmitter 710, such as a phone or other handheld electronic device) is a legacy device or a device that supports three differential signals.

It will be seen that the legacy signal uses three signal lines, which means only three switches are needed. Placing a switch in one line of a differential channel and not the other can result in an impedance mismatch in the differential transmission line. In one embodiment, the inclusion of not shown capacitor can compensate for the imbalance, given that both lines CL4 and CL5 have the same impedance to ground. Alternatively, the capacitor compensation can be designed to provide more specific compensation to balance the imbalance created by the switch. The switches on CL2 and CL3 provide comparable impedance on both lines, which is assumed to match sufficiently to not require additional compensation on the data channel.

Figure 8:
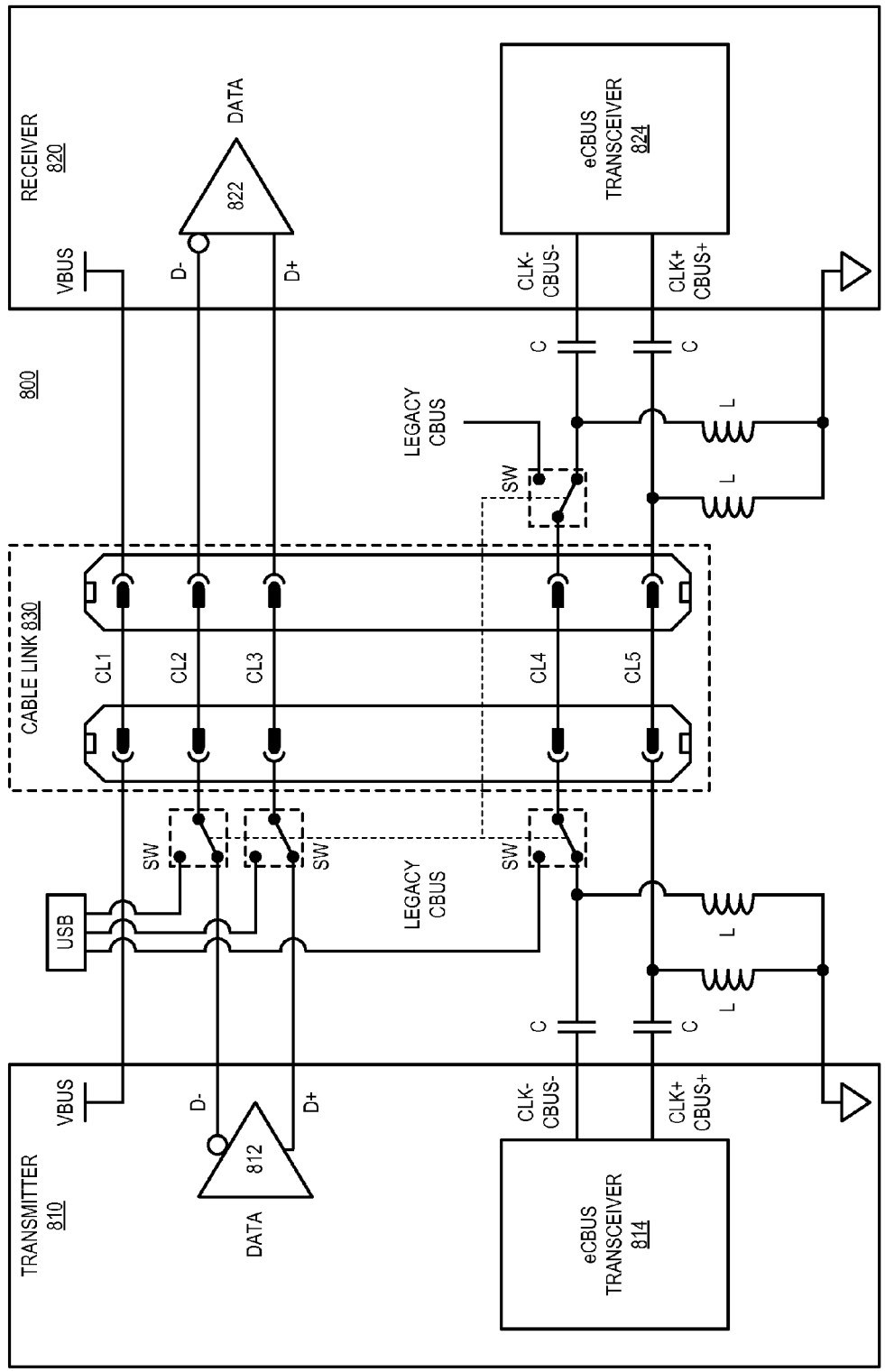
FIG. 8 is a block diagram of an embodiment of a system that implements a clock signal and bidirectional control signal over the same physical channel, and maintains backwards compatibility to legacy interfaces.

FIG. 8 is a block diagram of an embodiment of a system that implements a clock signal and bidirectional control bus over the same physical link, and maintains backwards compatibility to legacy interfaces. In one embodiment, system 800 represents an example system 100, and is an alternative to system 700. In one embodiment, system 800 can be implemented with the standard, well-known interface port, and provide support for a legacy connection on the standard interface port. Thus, for example, a standard micro-USB port can be used with power and support for a legacy connection. By leveraging the same port, but sending three differential signals over four lines, the 5-line interface can provide three differential signals as well as providing power, and can be switched to support the legacy connections of the port. The legacy interface can be provided with a switch matrix and/or a group of switches.

System 800 introduces an alternative way to send the third differential signal. Rather than modulating the signal component on one differential channel and its complement on the other differential channel, system 800 includes eCBUS transceiver 814, which places the third, bidirectional differential signal on top of one of the other differential channels. "eCBUS" refers to an enhanced CBUS signal, which generates clock over CBUS on a signal line. Thus, instead of having a component common-mode modulated onto both lines of a differential signal, two differential signals are transmitted simultaneously on the same differential channel. It will be understood that eCBUS can refer to a single ended signal, or a differential version as provided herein. Thus, two signals are superimposed onto the same physical lines, namely a bidirectional control signal over a clock signal. eCBUS 814 operates via edge modulation of a clock signal, or clock edge modulation (CEM), which modulates a data signal onto one of the edges of a clock signal. Briefly, it is understood that only one edge of the clock (falling or rising) is needed to synchronize a system. Thus, one edge is used as a clock signal to synchronize the system, and the other can be modulated to indicate a one or zero. In one embodiment, a zero is indicated by no adjustment of the edge, and a one can be indicated by adjusting the edge in time via pulse width modulation (delaying the edge and/or sending the edge early), and the edge adjustment can be alternated to maintain DC balance. Thus, the clock signal is still recovered, and a data signal can be modulated onto an edge. In one embodiment, such modulation can be further enhanced to make the signal bidirectional (e.g., such as control signal) by modulating the edge and adjusting the amplitude for the reverse signal.

It will be understood that although eCBUS 814 and eCBUS 824 are illustrated as transceiver elements, the illustration is only meant to imply the transceiver nature of the element, and the internal structure of the elements will be different from previous transceiver elements. In one embodiment, superimposing two differential signals over the same physical channel can be accomplished via adjustments to the timing of the signals (e.g., adjusting the edges) in combination with an expected timing on the part of the receiving device. In one embodiment, the falling edge of the clock is used. Thus, offsets in the signal edges can be detected as being outside of the expected timing, and thus, interpreted as a one or zero for the overlain signal. More details of clock edge modulation can be found in U.S. patent application Ser. No. 11/264,303, entitled "Clock Edge Modulated Serial Link with DC-Balance Control," and filed Oct. 31, 2005.

The power rail is referred to as VBUS, and is shown on line CL1 of cable link 830. In a configuration where system 800 is used to transmit three differential signals over four signal lines, system 800 is configured with transmitter 810 including driver 812 to generate the differential data signal on lines CL2 and CL3. Receiver 820 includes element 822 to receive the data signal on lines CL2 and CL3. Transmitter 810 includes transceiver 814 to generate the differential clock signal and CBUS signal on lines CL4 and CL5. Receiver 820 includes transceiver 824 to receive the clock signal and CBUS signal on lines CL4 and CL5.

System 800 provides VBUS on CL1, and provides the ground return path by DC referencing one or both signal pairs to GND using inductors L. As illustrated, inductors L on wires CL4 and CL5 couple the signal line to ground to provide a ground return path. Thus, transmitter 810 can terminate to a local ground, and receiver 820 can terminate to a local ground.

In one embodiment, system 800 includes switches to selectively switch between using four lines for three differential signals as described above, and using line CL5 as a clock signal and using line CL4 as a legacy (single-ended) control bus signal. Data can still be sent differentially over CL2 and CL3, and VBUS remains on CL1. Typically, all switches will be operated together. Thus, there is a single activation for all switches to change. In one embodiment, system 800 includes detection hardware (not explicitly shown) and/or detection logic to determine if the attached device (i.e., transmitter 810, such as a phone or other handheld electronic device) is a legacy device or a device that supports three differential signals.

It will be seen that the legacy signal uses three signal lines, which means only three switches are needed. Placing a switch in one line of a differential channel and not the other can result in an impedance mismatch in the differential transmission line. In one embodiment, the inclusion of inductors L compensate for the imbalance, given that both lines CL4 and CL5 can have the same impedance to ground. Alternatively, the inductor compensation can be designed to provide more specific compensation to balance the imbalance created by the switch. The switches on CL2 and CL3 provide comparable impedance on both lines, which is assumed to match sufficiently to not require additional compensation on the data channel.

Figure 9:
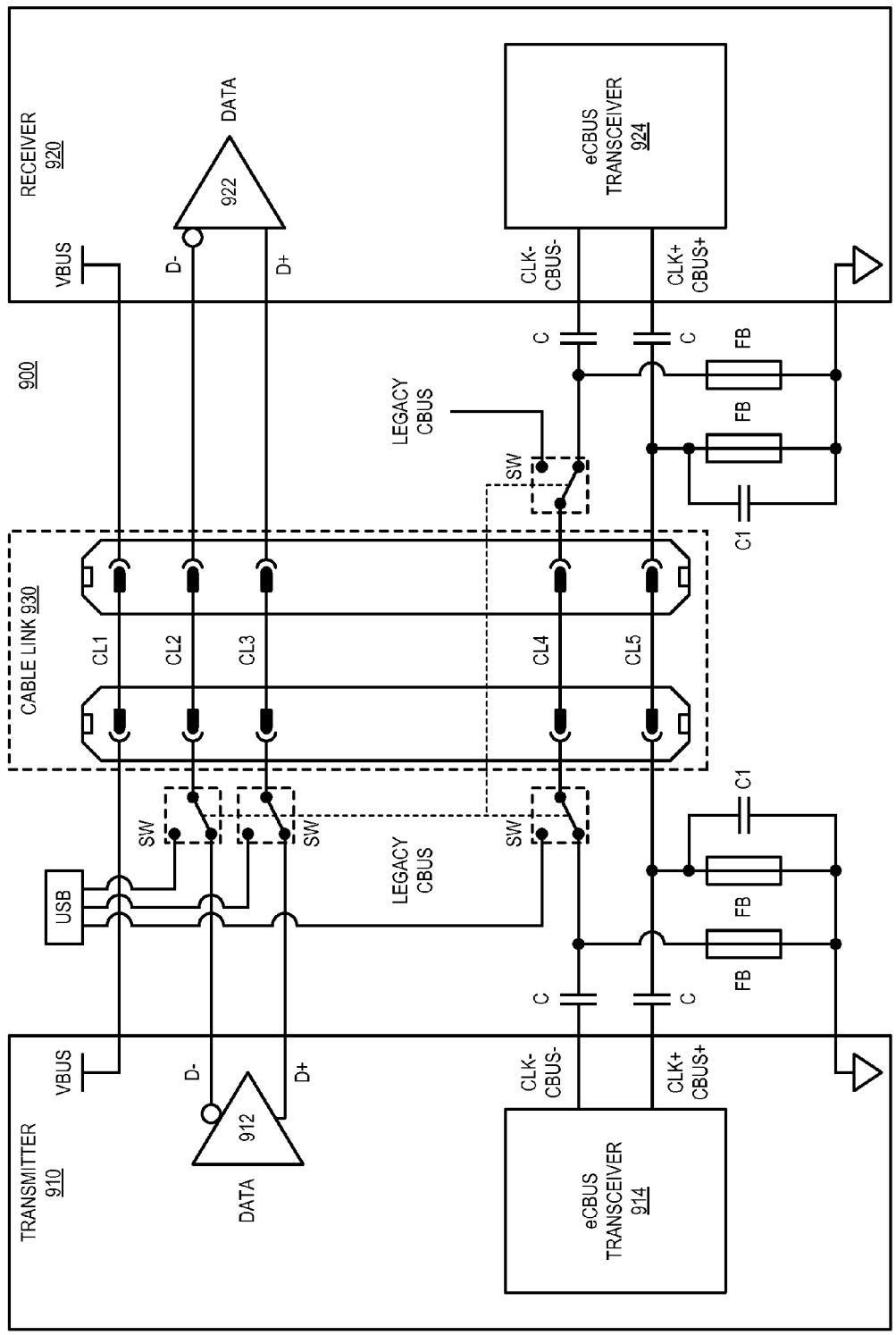
FIG. 9 is a block diagram of an alternative embodiment of a system that implements a clock signal and bidirectional control signal over the same physical channel with impedance compensation, and maintains backwards compatibility to legacy interfaces.

FIG. 9 is a block diagram of an alternative embodiment of a system that implements a clock signal and bidirectional control bus over the same physical link with impedance compensation, and maintains backwards compatibility to legacy interfaces. In one embodiment, system 900 represents an example system 100, and is an alternative to system 800. Systems 900 and 800 are essentially equivalent. Thus, descriptions above with respect to elements 812, 814, 822, 824, and the elements of cable link 830 apply to elements 912, 914, 922, 924, and the elements of cable link 930, respectively.

In system 900, the inductors are shown as ferrite beads FB. It will be understood that the legacy CBUS switch introduces an imbalance in the transmission line of the differential channel over CL4 and CL5. In one embodiment, system 900 includes compensation capacitors C1 from modal line CL5 to ground to compensate for the switch capacitance to ground in anti-modal line CL4.

As shown, system 900 provides VBUS on CL1, and provides the ground return path by DC referencing one or both signal pairs to GND using ferrite beads FB. As illustrated, ferrite beads FB on wires CL4 and CL5 couple the signal line to ground to provide a ground return path. Thus, transmitter 910 can terminate to a local ground, and receiver 920 can terminate to a local ground. In one embodiment, system 900 includes switches to selectively switch between using four lines for three differential signals as described above, and using line CL5 as a clock signal and using line CL4 as a legacy (single-ended) control bus signal. Data can still be sent differentially over CL2 and CL3, and VBUS remains on CL1.

Figure 10:
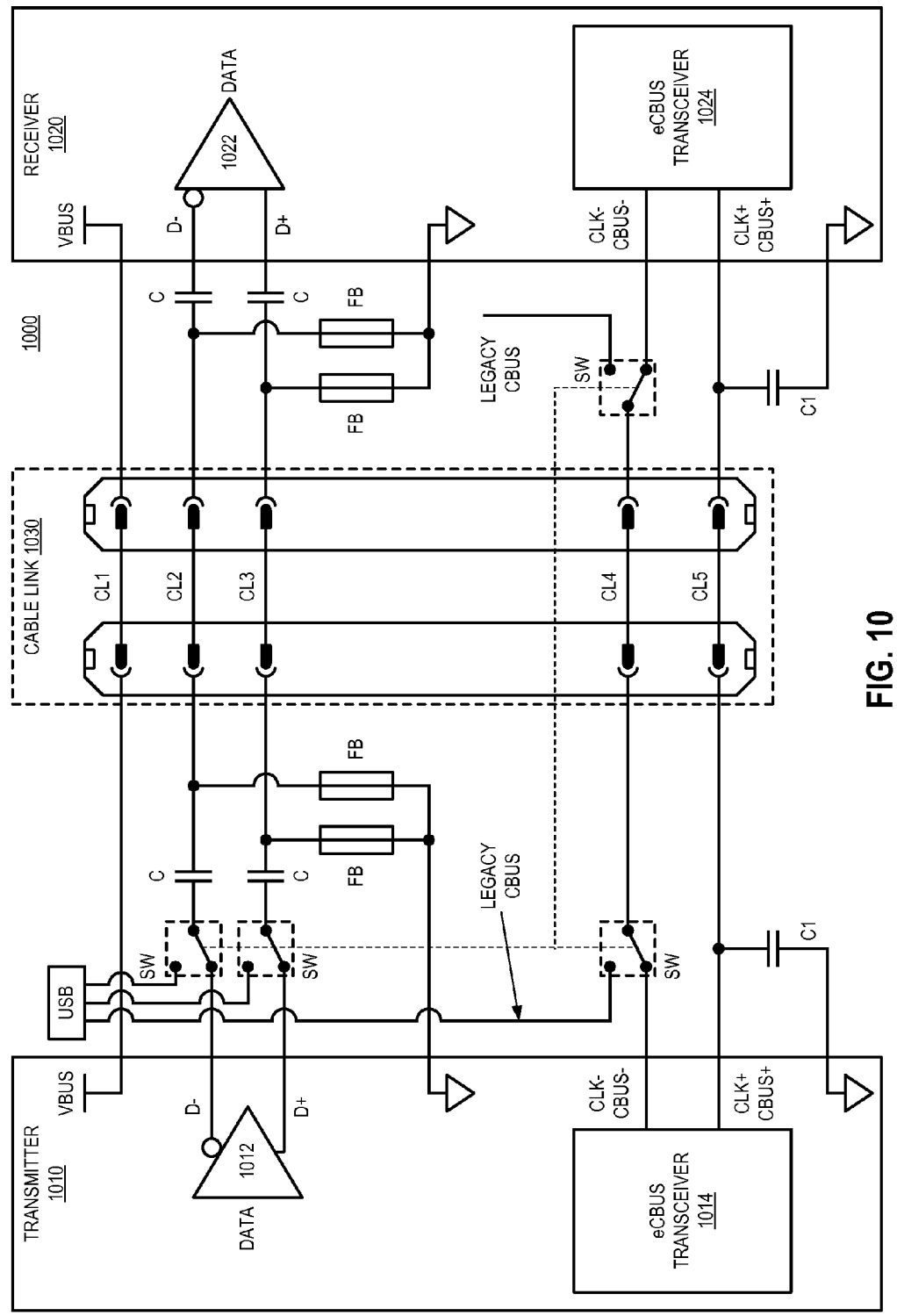
FIG. 10 is a block diagram of an embodiment of a system that implements a clock signal and bidirectional control signal over the same physical channel with impedance compensation, and implements a ground return line over the data channel, while maintaining backwards compatibility to legacy interfaces.

FIG. 10 is a block diagram of an embodiment of a system that implements a clock signal and bidirectional control bus over the same physical link with impedance compensation, and implements a ground line over the data link, while maintaining backwards compatibility to legacy interfaces. In one embodiment, system 1000 represents an example system 100, and is an alternative to system 900. Descriptions above with respect to systems 800 and 900 apply to elements of system 1000 with the exception of what is specifically pointed out below.

It will be observed that in systems 700, 800, and 900, a DC ground return path is referenced on a signal line that includes a switch. Thus, in those system examples, the switch is required to carry a DC ground return path. Switches that have good performance for high speed signaling are generally smaller than what is desired to switch power. Thus, there are tradeoffs in passing power through a switch that also needs to carry a high speed data signal, as in those systems. One alternative is to have only a single DC ground return path on the non-switched cable link line, which creates transmission line imbalance as discussed elsewhere. System 1000 provides improvement over the designs of systems 700, 800, and 900 by bringing the switches inside the AC coupling capacitors, where the inductor referencing is performed on the other side of the coupling capacitors. Thus, the legacy control bus signal line is not referenced to ground, and the switches are not required to carry power.

Instead of providing the ground return path by connecting the eCBUS channel with wound inductors, system 1000 provides a ground return path by connecting the data channel with ferrite beads inductors FB. Thus, transmitter 1010 can terminate to a local ground, and receiver 1020 can terminate to a local ground. In one embodiment, system 1000 includes switches to selectively switch between using four lines for three differential signals as described above, and using line CL5 as a clock signal and using line CL4 as a legacy (single-ended) control bus signal. Data can still be sent differentially over CL2 and CL3, and VBUS remains on CL1.

When switches are provided on both signal lines of a differential channel, the transmission line is not unbalanced, and no compensation is needed. However, when a switch is provided on only one signal line of a differential channel, it results in an AC unbalanced differential transmission line, due to the capacitance of the switch. Compensation for the imbalance can be created by placing capacitance on the other transmission line. Thus, in system 1000 the differential channel across CL4 and CL5 has an AC imbalance due to the switches in anti-modal line CL4. In one embodiment, capacitors C1 are placed from modal line CL5 to ground at both the transmitter and ground to compensate for the switches. The value of capacitors C1 can be selected in accordance with the specific implementation to compensate for the specific switch component used.

Figure 11:
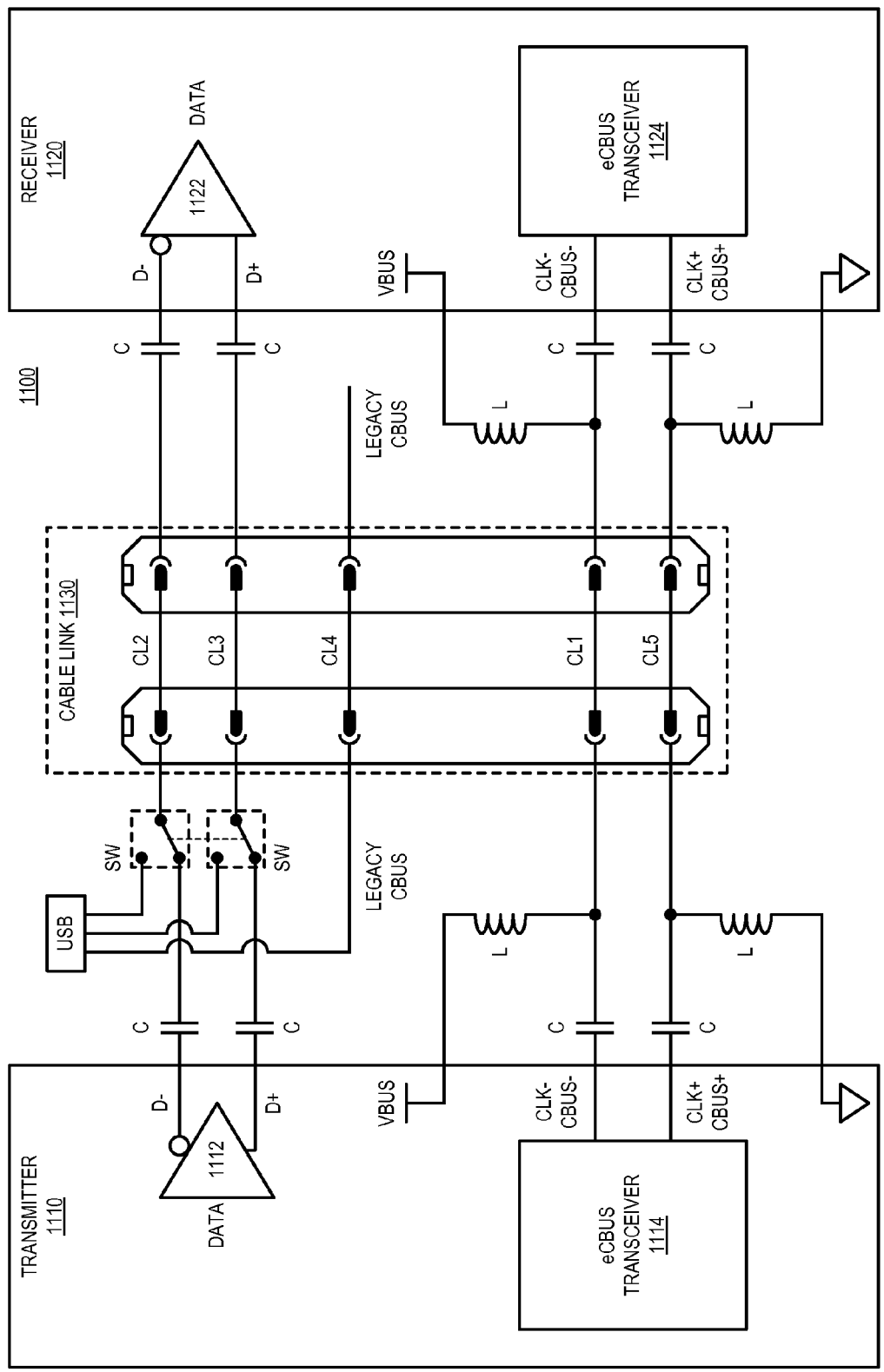
FIG. 11 is a block diagram of an embodiment of a system that implements a clock signal and bidirectional control signal over the same physical channel, and provides power and ground over the physical channel, while maintaining backwards compatibility to legacy interfaces.

FIG. 11 is a block diagram of an embodiment of a system that implements a clock signal and bidirectional control signal over the same physical link, and provides power and ground over the physical link, while maintaining backwards compatibility to legacy interfaces. Typically it would not be desirable to design a system to place the voltage supply over a switched line. Switches tend to be designed either for power or for switching speed, but not both.

However, by adjusting the pin-out configuration of cable link 1130, system 1100 can provide power over a differential signal channel, and reduce the need for switches down to two. Legacy CBUS or a legacy control signal is provided by itself on CL4, instead of providing VBUS on its own dedicated line. VBUS and ground are provided over the eCBUS differential channel. Thus, in one embodiment, the third differential signal is sent virtually by modulating the bidirectional differential signal components over a differential signal on a physical differential line. Thus, effectively one differential signal channel would have two differential signals on the same lines, as well as providing the DC power. In this respect, two physical signal lines can be used to provide power across the link, as well as providing a differential clock signal and a bidirectional data signal.

In one embodiment, system 1100 represents an example system 100. In one embodiment, system 1100 can be implemented with the standard, well-known interface port, and provide support for a legacy connection the standard interface port while also providing power. Thus, for example, system can use a standard micro-USB port with power and support for a legacy connection. By leveraging the same port, but sending three differential signals over four lines, the 5-line interface can provide three differential signals as well as providing power, and can be switched to support the legacy connections of the port.

In system 1100, as with system 800 described above, the third differential signal is sent superimposed on a differential clock channel. Thus, system 1100 uses eCBUS transceivers 1114 and 1124 to transmit the third, bidirectional differential signal. In a switch configuration where system 1100 is used to transmit three differential signals over four signal lines, system 1100 is configured with transmitter 1110 including driver 1112 to generate the differential data signal on lines CL2 and CL3. Receiver 1120 includes element 1122 to receive the data signal on lines CL2 and CL3. Transmitter 1110 includes transceiver 1114 to generate the differential clock signal and CBUS signal on lines CL1 and CL5. Receiver 1120 includes transceiver 1124 to receive the clock signal and CBUS signal on lines CL1 and CL5. Rather than modulating the signal component on one differential channel and its complement on the other differential channel, system 1100 includes eCBUS transceiver 1114, which places the third, bidirectional differential signal on top of one of the other differential channels, and specifically, the clock and CBUS signals as illustrated. Thus, two differential signals are transmitted simultaneously on the same differential channel.

System 1100 provides a separate line for legacy CBUS on CL4 over cable link 1130. It will be understood that with legacy CBUS on its own line, the interface essentially becomes a 4-line interface that supports three differential lines and power. System 1100 still provides VBUS on CL1, and provides the ground return path on CL5. However, in system 1100, both power and ground are provided over the signal lines. More particularly, eCBUS is sent over a differential pair of CL1 and CL5. CL1 is referenced to VBUS via inductor L, and CL5 is referenced to ground via inductor L. It will be understood that by providing the voltage rail on one line of the differential channel and the ground path on the other line of the same differential channel, there is no mismatch created by having the signals on only the one line. Thus, whereas both lines are terminated to GND in other embodiments, both lines reference the power path. Thus, transmitter 1110 can terminate to a local ground and reference a local power supply, and receiver 1120 can terminate to a local ground and reference a local power supply, and the signaling exchange will still provide power to the docked or attached device. It will be seen that the legacy signal uses three signal lines, but seeing that one of the legacy signals (legacy CBUS) has a dedicated line, only two switches are needed, which can avoid the transmission line imbalance of previous examples.

FIG. 12A is a flow diagram of an embodiment of transmitting three differential signals, including a virtual bidirectional differential signal, over two physical links. Process 1200 for interface signaling including transmitting three differential signals over two differential channels. A system provides a physical interface that has a first differential channel with two lines, 1202, and a second differential channel with two lines, 1204. In one embodiment, the system can selectively switch the interface to configure the interface to interconnect to a legacy device that uses a legacy physical interconnection without three differential signal channels, or to selectively switch and configure the physical interface to accept three differential signals in accordance with any embodiment described herein. Thus, the system configures the first and second differential channels for a desired signaling interface, 1206.

If the signal configures for legacy interfacing, the interconnection would be in accordance with the legacy interconnection, and thus in accordance with known techniques. When the interface is configured for three differential signals, the system can then transmit a first differential signal over a first differential channel, 1208. The system can transmit a second differential signal over a second differential channel, 1210. The system transmits the third differential signal bidirectionally over a virtual channel by modifying operation of either or both of the first and second differential channels, 1212.

As described herein, modifying the differential channels can include modulating one component of the virtual signal onto the first differential channel, and the complementary component onto the second differential channel. Alternatively, the system can employ a signaling mechanism that allows simultaneous transmission of two differential signals on the same physical channel, where one of the two signals on the same channel is virtually transmitted via timing/transitioning mechanisms, for example. The hardware interface configuration can further include the providing of power.

FIG. 12B is a flow diagram of an embodiment of configuring an interface to transmit either three differential signals over two physical channels, or to transmit in accordance with a legacy interconnection interface. Process 1206 for configuring the interface can include the following. In one embodiment, the system determines if a device attached to or docked with the interface supports differential signaling for all signals, or if the device is a legacy device that does not support differential signaling for all signals, 1220. If the device is a legacy device, 1222 YES branch, the system switches the interface for use with legacy line configuration (e.g., single-ended control bus signal), 1224. If the device is not a legacy device, 1222 NO branch, the system switches the interface for use with differential line configuration, 1226. It will be understood that while 1224 and 1226 expressly state "switching" the interface, if the interface is to be used in current configuration of the interface, no switching is required to configure the interface. Thus, configuring the interface can be optional in certain circumstances. In one embodiment, configuring the interface can include providing power over one or more signaling channels by providing power paths via inductors connected to one or more signal lines, 1228.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for signal transmission over a data link, comprising:
    transmitting, at a device, a first differential signal over a first differential communication channel having two signal lines;
    transmitting, at the device, a second differential signal over a second differential communication channel having two signal lines, the second differential communication channel being different from the first differential communication channel; and
    bidirectionally, at the device, transmitting a third differential control channel signal and receiving a fourth differential control channel signal over the two lines of the first differential communication channel and the two lines of the second differential communication channel while transmitting either or both of the first and second differential signals,
    wherein bidirectionally transmitting and receiving comprises:
        transmitting, to a remote transceiver, (i) a first modal component of the third differential control channel signal by common mode modulating the first modal component onto the two lines of the first differential communication channel, and (ii) a first anti-modal component of the third differential control channel signal by common mode modulating the first anti-modal component onto the two lines of the second differential communication channel, and
        receiving, from the remote transceiver, (i) a second modal component of the fourth differential control channel signal over the two lines of the first differential communication channel, the second modal component common mode modulated onto the two lines of the first differential communication channel, and (ii) a second anti-modal component of the fourth differential control channel signal over the two lines of the second differential communication channel, the second anti-modal component common mode modulated onto the two lines of the second differential communication channel.

2. The method of claim 1, wherein the first differential signal comprises a data signal.

3. The method of claim 1, wherein the second differential signal comprises a clock signal.

4. The method of claim 1, further comprising:
    providing DC (direct current) power across the data link in either direction, by providing an additional voltage supply line, and by providing a ground return path via coupling both ends of one signal line of the first differential communication channel to local ground rails via inductors.

5. The method of claim 4, wherein the inductors comprise ferrite beads.

6. The method of claim 1, further comprising:
    providing DC power across the data link in either direction, by providing a voltage supply via coupling both ends of one signal line of the first differential communication channel to local voltage rails via inductors, and by providing a ground return path via coupling both ends of one signal line of the second differential communication channel to local ground rails via inductors.

7. The method of claim 1, further comprising:
    selectively switching a legacy communication channel interface with the differential communication channels, including:
        providing two signals on the two signal lines of the first differential communication channel; and
        providing one single-ended signal on one of the two signal lines of the second differential communication channel.

8. The method of claim 7, further comprising:
    providing DC power across the data link in either direction, by providing an additional voltage supply line, and by providing a ground return path via coupling both ends of one signal line of one of the differential communication channels to local ground rails via inductors.

9. The method of claim 1, further comprising:
    selectively switching a legacy communication channel interface with the differential communication channels, including:
        providing two signals on the two signal lines of the first differential communication channel;
        providing a single-ended legacy bidirectional control signal over an additional signal line; and
        providing DC power across the data link by coupling both ends of one signal line of the second differential communication channel to local voltage rails via inductors and by coupling both ends of the other signal line of the second differential communication channel to local ground rails via inductors.

10. An article of manufacture comprising a non-transitory computer readable storage medium having content stored thereon, which when executed cause a machine to perform operations including:
    transmitting, at a device, a first differential signal over a first differential communication channel having two signal lines;
    transmitting, at the device, a second differential signal over a second differential communication channel having two signal lines, the second differential communication channel being different from the first differential communication channel; and
    bidirectionally, at the device, transmitting a third differential control channel signal and receiving a fourth differential control channel signal over the two lines of the first differential communication channel and the two lines of the second differential communication channel while transmitting either or both of the first and second differential signals,
    wherein bidirectionally transmitting and receiving comprises:
        transmitting, to a remote transceiver, (i) a first modal component of the third differential control channel signal by common mode modulating the first modal component onto the two lines of the first differential communication channel, and (ii) a first anti-modal component of the third differential control channel signal by common mode modulating the first anti-modal component onto the two lines of the second differential communication channel, and receiving, from the remote transceiver, (i) a second modal component of the fourth differential control channel signal over the two lines of the first differential communication channel, the second modal component common mode modulated onto the two lines of the first differential communication channel, and second anti-modal component of the fourth differential control channel signal over the two lines of the second differential communication channel, the second anti-modal component common mode modulated onto the two lines of the second differential communication channel.

11. The article of manufacture of claim 10, further comprising content for:

providing DC (direct current) power over an additional voltage supply line, and coupling both ends of one signal line of the first differential communication channel to local ground rails via inductors to provide a ground return path.

12. The article of manufacture of claim 10, further comprising content for:

providing DC power by providing a voltage supply via coupling both ends of one signal line of the first differential communication channel to local voltage rails via inductors, and by providing a ground return path via coupling both ends of one signal line of the second differential communication channel to local ground rails via inductors.

13. The article of manufacture of claim 10, further comprising content for:

selectively switching a legacy communication channel interface with the differential communication channels, including providing two signals on the two signal lines of the first differential communication channel; and providing one single-ended signal on one of the two signal lines of the second differential communication channel.

14. A communication interface apparatus comprising:

a first differential signal transmission circuit coupled to a first differential communication channel having two signal lines, the first differential signal transmission circuit to transmit a first differential signal over the first differential communication channel;

a second differential signal transmission circuit coupled to a second differential communication channel having two signal lines, the second differential signal transmission circuit to transmit a second differential signal over the second differential communication channel; and a bidirectional transceiver comprising:

a transmitter to transmit, to a remote transceiver, (i) a first modal component of a third differential control channel signal by common mode modulating the first modal component onto the two lines of the first differential communication channel, and (ii) a first anti-modal component of the third differential control channel signal by common mode modulating the first anti-modal component onto the two lines of the second differential communication channel, and a receiver to receive, from the remote transceiver, (i) a second modal component of a fourth differential control channel signal over the two lines of the first differential communication channel, the second modal component common mode modulated onto the two lines of the first differential communication channel, and (ii) a second anti-modal component of the fourth differential control channel signal over the two lines of the second differential communication channel, the second anti-modal component common mode modulated onto the two lines of the second differential communication channel.

15. The communication interface apparatus of claim 14, further comprising inductors for each line of the first or second differential communication channel to couple to local ground rails.

16. The communication interface apparatus of claim 14, further comprising inductors for each line of the first or second differential communication channel to couple to local voltage rails.

17. The communication interface apparatus of claim 14, further comprising a switch matrix to selectively switch a legacy communication channel interface with the differential communication channels, the legacy communication channel interface configured to provide two signals on the two signal lines of the first differential communication channel, and provide one single-ended signal on one of the two signal lines of the second differential communication channel according to the switch matrix.

* * * * *